United States Patent
Ono

(10) Patent No.: US 10,280,993 B2
(45) Date of Patent: May 7, 2019

(54) ELECTROMAGNETIC BRAKE

(71) Applicant: Fanuc Corporation, Yamanashi (JP)

(72) Inventor: Katsuya Ono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/662,620

(22) Filed: Jul. 28, 2017

(65) Prior Publication Data
US 2018/0058522 A1 Mar. 1, 2018

(30) Foreign Application Priority Data

Aug. 30, 2016 (JP) .................................. 2016-168565

(51) Int. Cl.
F16D 63/00 (2006.01)
F16D 65/18 (2006.01)
F16D 121/20 (2012.01)

(52) U.S. Cl.
CPC .......... F16D 63/002 (2013.01); F16D 65/186 (2013.01); *F16D 2121/20* (2013.01); *F16D 2250/0084* (2013.01)

(58) Field of Classification Search
CPC .. F16D 63/002; F16D 65/186; F16D 2121/20; F16D 2250/0084
See application file for complete search history.

(56) References Cited

U.S. PATENT DOCUMENTS

| 4,258,749 A * | 3/1981 | Mayer ................. F16K 31/0651 |
| | | 137/596.17 |
| 4,903,543 A | 2/1990 | Matt |
| 4,947,547 A | 8/1990 | Matt |
| 5,419,217 A | 5/1995 | Umezawa et al. |
| 5,598,631 A | 2/1997 | Umezawa et al. |

FOREIGN PATENT DOCUMENTS

| CA | 1326182 C | 1/1994 |
| EP | 0486876 A2 | 5/1992 |
| JP | S50-152028 U | 12/1975 |

(Continued)

OTHER PUBLICATIONS

Japan Patent Office, Office Action dated Jun. 26, 2018 for Japan Patent Application No. 2016-168565.

(Continued)

*Primary Examiner* — Melanie Torres Williams
(74) *Attorney, Agent, or Firm* — Winstead PC

(57) ABSTRACT

A coil bobbin and a brake core are secured to each other readily and more tightly. Provided is an electromagnetic brake including an annular coil bobbin around which an excitation coil is wound, a brake core having an annular recess that accommodates the coil bobbin, and an armature driven by an electromagnetic force generated by the excitation coil. An inner surface of a center hole in the coil bobbin is provided with inner protrusions that protrude radially inward from a plurality of locations at intervals in a circumferential direction and that are pressed onto an outer peripheral surface of a columnar central projection included in the recess when the coil bobbin is press-fitted to the recess of the brake core. The inner protrusions are disposed substantially along the entire length of the coil bobbin in an axial direction thereof.

8 Claims, 13 Drawing Sheets

(56) References Cited

FOREIGN PATENT DOCUMENTS

| JP | S54-32643 U | 3/1979 |
| JP | S63-297707 A | 12/1988 |
| JP | H05-010340 A | 1/1993 |
| JP | H05-57406 U | 7/1993 |
| JP | H05-256330 A | 10/1993 |
| JP | 2001-060472 A | 3/2001 |
| JP | 2004-360835 A | 12/2004 |

OTHER PUBLICATIONS

Japan Patent Office, Search Report dated Jun. 18, 2018 for Japan Patent Application No. 2016-168565.

* cited by examiner

ELECTROMAGNETIC BRAKE

CROSS-REFERENCE TO RELATED APPLICATIONS

This application is based on Japanese Patent Application No. 2016-168565, the contents of which are incorporated herein by reference.

Technical Field

The present invention relates to electromagnetic brakes.

Background Art

In a known electromagnetic brake in the related art, in order to secure a coil bobbin, having an excitation coil wound therearound, in an accommodated state in a recess of a brake core, the coil bobbin is provided with a protrusion. When inserting the coil bobbin into the brake core, the protrusion is plastically deformed so that the coil bobbin is secured to the brake core by being press-fitted thereto (for example, see Patent Literature 1).

In another known electromagnetic brake, a locking section is provided at an axial end of the brake core to suppress axial movement of the coil bobbin. Moreover, the coil bobbin and the brake core are secured to each other by means of an impregnating agent that is cured after being injected to the excitation coil (for example, see Patent Literature 2).

CITATION LIST

Patent Literature

{PTL 1}
Japanese Unexamined Utility Model Application, Publication No. Sho 54-32643
{PTL 2}
Japanese Unexamined Patent Application, Publication No. Hei 5-256330

SUMMARY OF INVENTION

Technical Problem

An object of the present invention is to provide an electromagnetic brake that can secure a coil bobbin and a brake core to each other readily and more tightly.

Solution to Problem

An aspect of the present invention provides an electromagnetic brake including an annular coil bobbin around which an excitation coil is wound, a brake core having an annular recess that accommodates the coil bobbin, and an armature driven by an electromagnetic force generated by the excitation coil. An inner surface of a center hole in the coil bobbin is provided with inner protrusions that protrude radially inward from a plurality of locations at intervals in a circumferential direction and that are pressed onto an outer peripheral surface of a columnar central projection included in the recess when the coil bobbin is press-fitted to the recess of the brake core. The inner protrusions are disposed substantially along the entire length of the coil bobbin in an axial direction thereof.

In the above aspect, the brake core and the coil bobbin accommodated in the recess of the brake core may be secured to each other by means of an adhesive.

In the above aspect, the outer peripheral surface of the central projection may be provided with a conical projection-side inclined surface whose outer diameter gradually increases in the axial direction from a distal end of the central projection.

In the above aspect, each inner protrusion may have a protrusion-side inclined surface that is provided at a leading end of the inner protrusion in a press-fitting direction toward the recess and that gradually extends radially inward toward a trailing end of the inner protrusion.

In the above aspect, an outer peripheral surface of the coil bobbin may be provided with outer protrusions that protrude radially outward from a plurality of locations at intervals in the circumferential direction and that are pressed onto an inner side surface of the recess when the coil bobbin is press-fitted to the recess of the brake core.

In the above aspect, the inner protrusions may be disposed uniformly in the circumferential direction.

In the above aspect, the inner protrusions may be inclined relative to the axial direction of the coil bobbin.

In the above aspect, the inner protrusions may have a conical shape and may be disposed at intervals in the axial direction of the coil bobbin.

Another aspect of the present invention provides an electromagnetic brake including an annular coil bobbin around which an excitation coil is wound, a brake core having an annular recess that accommodates the coil bobbin, and an armature driven by an electromagnetic force generated by the excitation coil. An inner surface of a center hole in the coil bobbin is provided with inner protrusions that protrude annularly and radially inward along the entire circumference and that are pressed onto an inner side surface of the recess when the coil bobbin is press-fitted to the recess of the brake core. The inner protrusions are disposed substantially along the entire length of the coil bobbin at intervals in an axial direction thereof.

DESCRIPTION OF EMBODIMENTS

An electromagnetic brake 1 according to an embodiment of the present invention will be described below with reference to the drawings.

Figure 1:
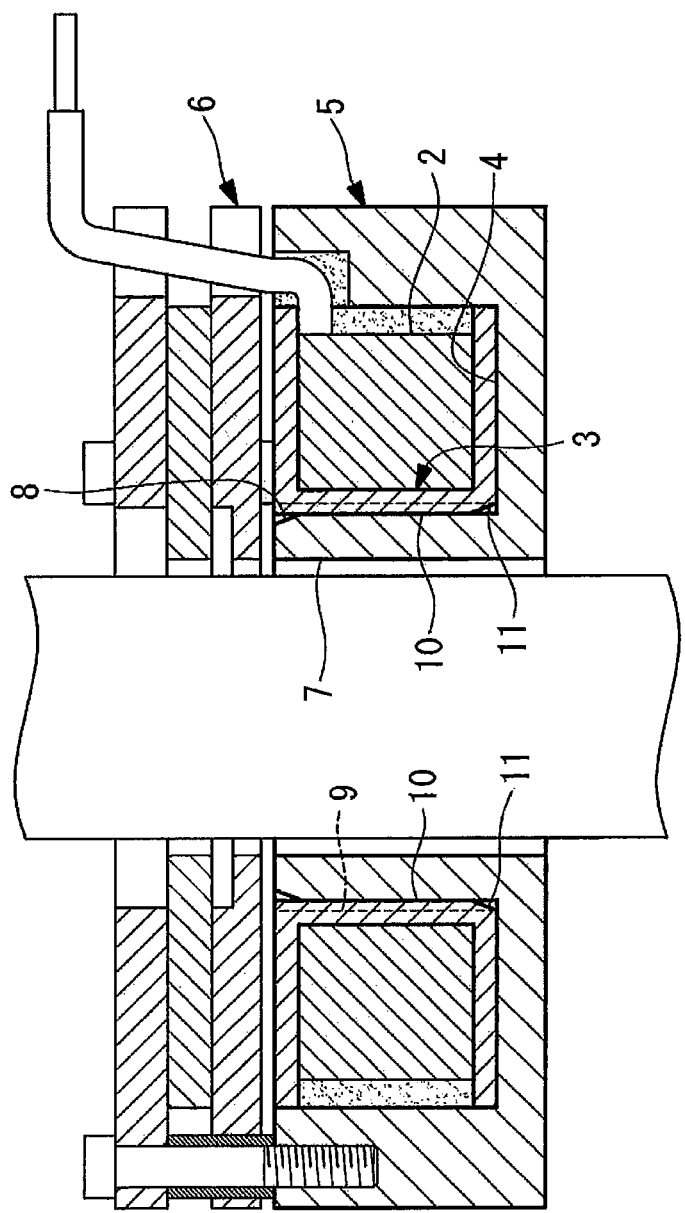
FIG. 1 is a vertical sectional view illustrating an electromagnetic brake according to an embodiment of the present invention.

As shown in FIG. 1, the electromagnetic brake 1 according to this embodiment includes an annular coil bobbin 3 around which an excitation coil 2 is wound, a brake core 5 having an annular recess 4 that accommodates the coil bobbin 3, and an armature 6 driven by an electromagnetic force generated by the excitation coil 2.

Figure 2A:
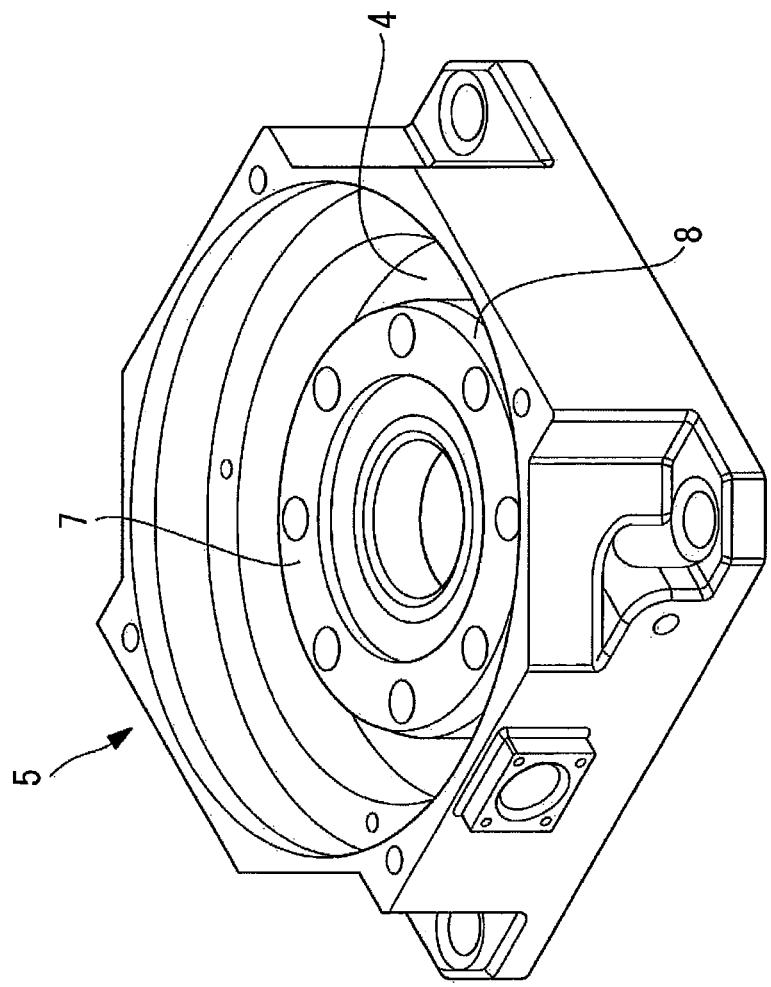
FIG. 2A is a perspective view illustrating a brake core of the electromagnetic brake in FIG. 1.

As shown in FIG. 2A, the recess 4 of the brake core 5 has a columnar central projection 7 in the center so as to have an annular shape that is open at one side in the axial direction.

Figure 2B:
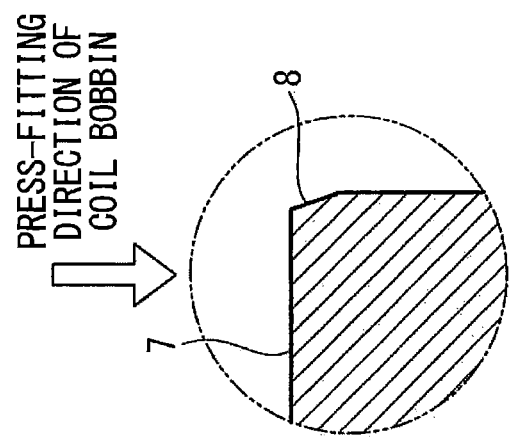
FIG. 2B is a partially-enlarged vertical sectional view of a central projection of the brake core of the electromagnetic brake in FIG. 1.

As shown in FIG. 2B, the outer peripheral surface at the distal end of the central projection 7 included in the recess 4 of the brake core 5 is provided with a conical projection-side inclined surface 8 whose outer dimension gradually increases in the depth direction from the distal end of the central projection 7.

Figure 3:
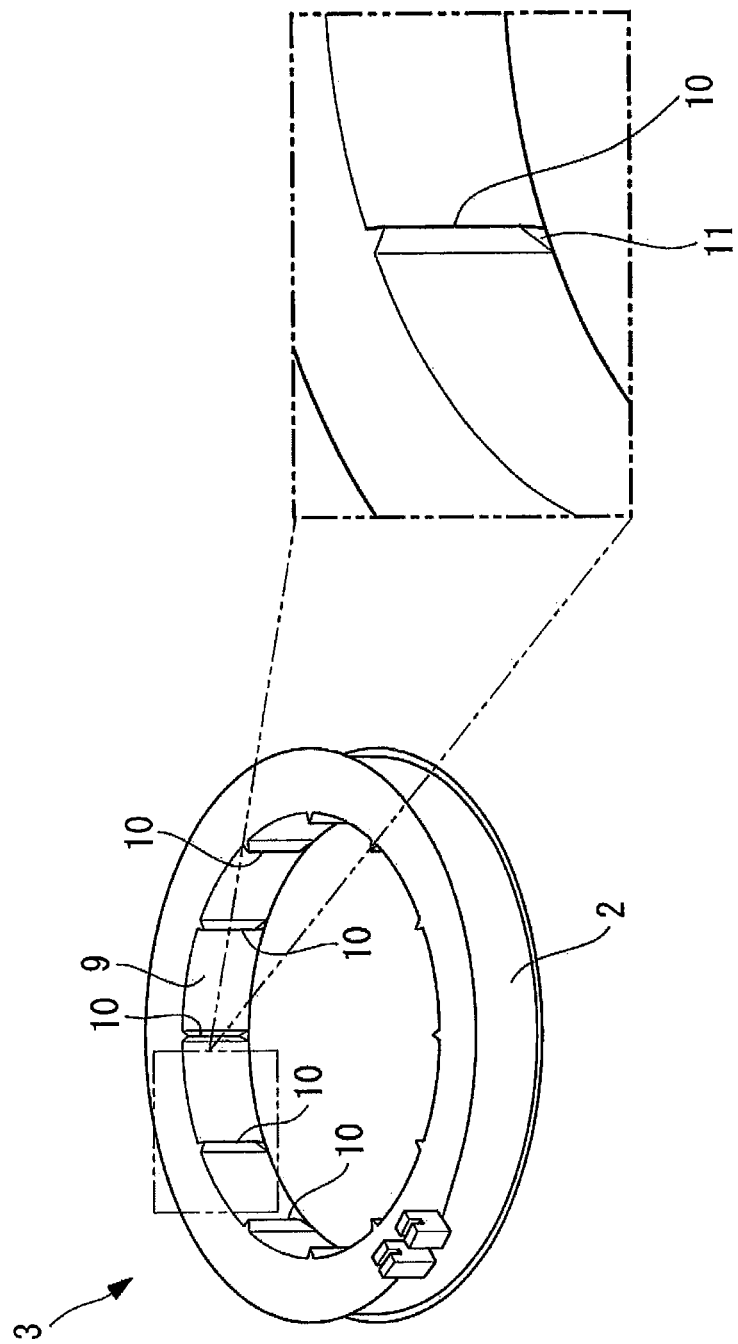
FIG. 3 is a perspective view illustrating a coil bobbin of the electromagnetic brake in FIG. 1.

As shown in FIG. 3, the coil bobbin 3 is provided with a center hole 9, and the inner surface of the center hole 9 is provided with a plurality of inner protrusions 10.

The inner protrusions 10 are provided at a plurality of locations at intervals in the circumferential direction. Each inner protrusion 10 extends straight substantially along the entire length of the coil bobbin 3 in the axial direction thereof, and the cross-sectional shape of each inner protrusion 10 taken along a plane orthogonal to the axis of the coil bobbin 3 is a triangular shape whose width gradually decreases inward in the radial direction.

Figure 4:
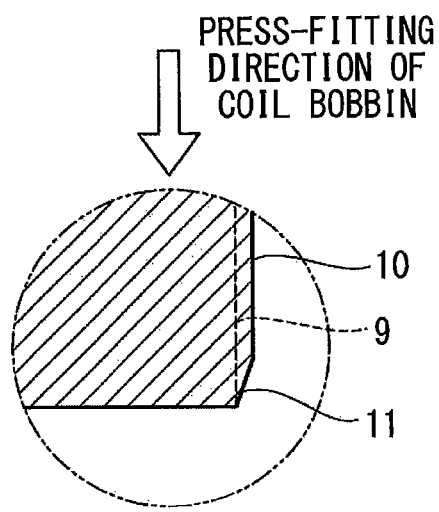
FIG. 4 is a partially-enlarged vertical sectional view of the coil bobbin in FIG. 3.

As shown in FIG. 4, each inner protrusion 10 has a protrusion-side inclined surface 11 that is provided at the leading end thereof in the inserting direction (press-fitting direction) toward the recess 4 of the brake core 5 and that is inclined from the leading end toward the trailing end such that the diameter gradually decreases. The protrusion-side inclined surface 11 sets the position, in the radial direction, of the inner protrusion 10 at the leading end on the radially outer side of the outer peripheral surface of the central projection 7 and is inclined along the axis toward the radially inner side of the outer peripheral surface of the central projection 7.

The operation of the electromagnetic brake 1 according to this embodiment having the above-described configuration will be described below.

Figure 5:
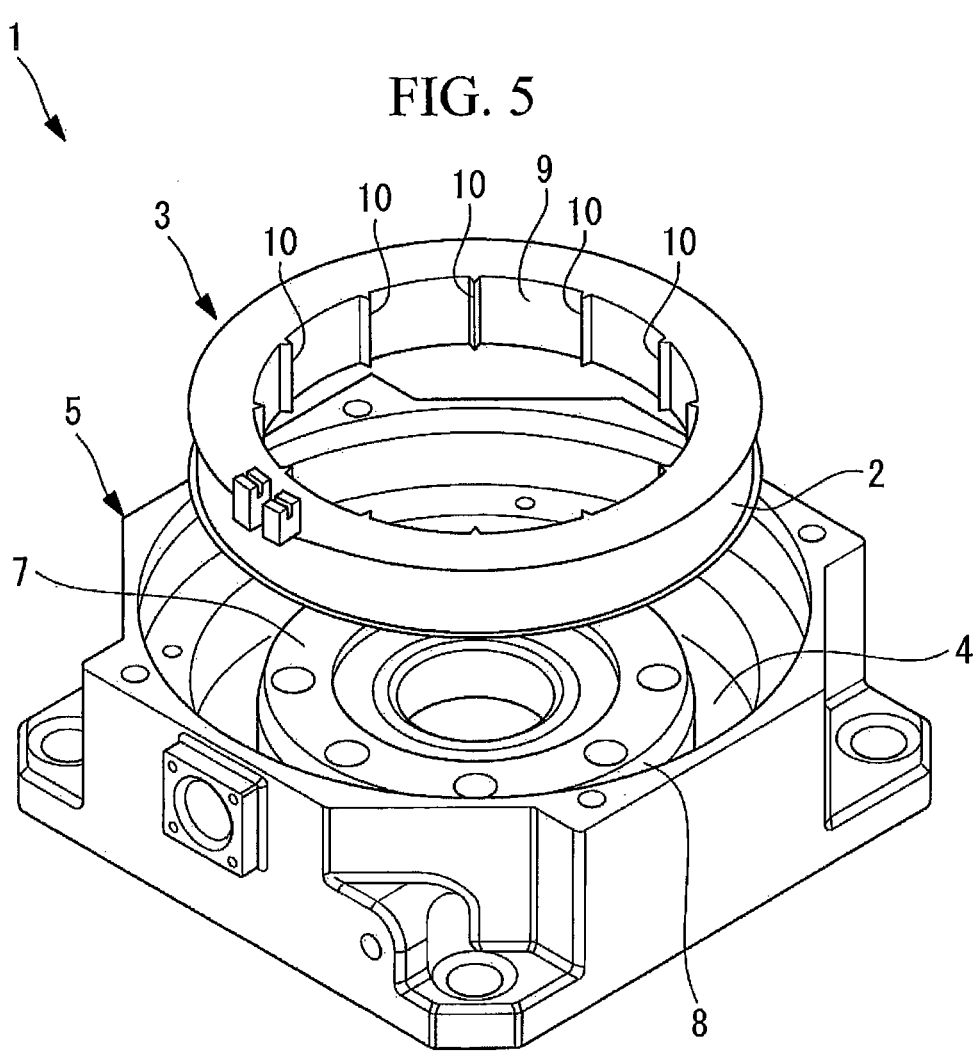
FIG. 5 is a perspective view illustrating a state where the brake core and the coil bobbin of the electromagnetic brake in FIG. 1 are being assembled together.

As shown in FIG. 5, in order to assemble the electromagnetic brake 1 according to this embodiment, the annular coil bobbin 3 having the excitation coil 2 wound around the outer periphery thereof is inserted into the annular recess 4, which is open in the axial direction of the brake core 5, from the end provided with the protrusion-side inclined surface 11.

Because the minimum inner diameter connecting the tips of the inner protrusions 10 is set to be smaller than the outer diameter of the central projection 7, when the central projection 7 of the brake core 5 is fitted to the center hole 9 in the coil bobbin 3, the inner protrusions 10 provided in the center hole 9 are pressed onto the outer peripheral surface of the central projection 7, so that the two are secured to each other in a manner such that they do not relatively move in the circumferential direction.

Because the inner protrusions 10 are provided substantially along the entire length of the coil bobbin 3 in the axial direction thereof, the inner protrusions 10 are pressed onto the inner side surface of the annular recess 4 of the brake core 5 substantially along the entire length in the axial direction, so that a securing force is generated at each position in the axial direction. Since the plurality of inner protrusions 10 are disposed at intervals in the circumferential direction, the securing force is generated uniformly at the respective positions in the circumferential direction.

Consequently, the inner protrusions 10 are press-fitted to the outer peripheral surface of the central projection 7 included in the recess 4, so that rotation of the coil bobbin 3 relative to the brake core 5 can be fixed more reliably.

In this case, because the inner protrusions 10 provided in the coil bobbin 3 are provided with the protrusion-side inclined surfaces 11, the inner protrusions 10 are pressed onto the outer peripheral surface of the central projection 7 with a small force at the beginning of the process for inserting the coil bobbin 3 into the recess 4. As a result, the frictional resistance is minimized during the inserting process, thereby achieving improved ease of insertion. As the coil bobbin 3 is inserted into the recess 4, the pressing force of the inner protrusions 10 onto the outer peripheral surface of the central projection 7 is increased, so that a large securing force can be achieved by the time the inserting process is completed.

Because the distal end of the central projection 7 is also provided with the conical projection-side inclined surface 8, the ease of insertion of the coil bobbin 3 into the recess 4 can be further improved.

In the electromagnetic brake 1 according to this embodiment, the inner protrusions 10 provided in the coil bobbin 3 are pressed onto the outer peripheral surface of the central projection 7 included in the recess 4 of the brake core 5 substantially along the entire length in the axial direction, so that the securing force is generated at the respective positions in the axial direction, whereby the coil bobbin 3 and the brake core 5 can be secured to each other more reliably at a fixed position.

Because the plurality of inner protrusions 10 are provided at intervals in the circumferential direction, a securing force can be generated uniformly along the entire circumference.

The press-fitting of the inner protrusions 10 to the outer peripheral surface of the central projection 7, which generates a high securing force as described above, is reduced at the start of the press-fitting process by the protrusion-side inclined surfaces 11 provided at the inner protrusions 10 and by the projection-side inclined surface 8 provided at the distal end of the central projection 7, thereby achieving both a high securing force and improved ease of insertion.

Because this structure exhibits a securing force for stopping relative rotation between the coil bobbin 3 and the brake core 5 by press-fitting the inner protrusions 10 into the outer peripheral surface of the central projection 7, the structure is also advantageous in that it is not necessary to wait for an impregnating agent to cure as in the related art, in that a securing force is generated immediately after the press-fitting process, and in that the coil bobbin 3 can be quickly and reliably prevented from rotating within the recess 4 of the brake core 5.

In this embodiment, the plurality of inner protrusions 10 are provided at intervals in the circumferential direction in the center hole 9 of the coil bobbin 3, so that there are gaps between inner protrusions 10 neighboring each other in the circumferential direction. Therefore, by injecting an adhesive into these gaps, the adhesive cures faster than an impregnating agent, so that the coil bobbin 3 and the brake core 5 can be secured to each other more tightly.

Figure 6:
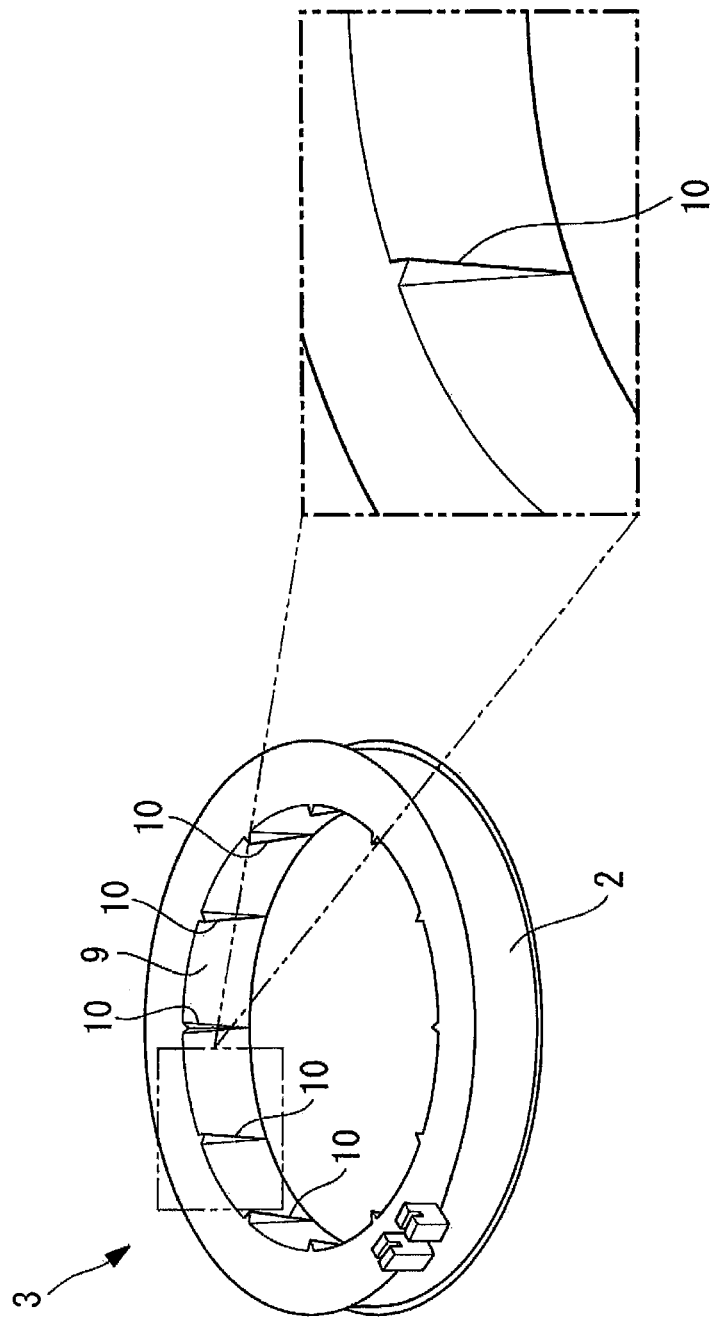
FIG. 6 is a perspective view illustrating a first modification of the coil bobbin in FIG. 3.

As an alternative to this embodiment in which the protrusion-side inclined surface 11 is provided at the inserting end of each inner protrusion 10, the protrusion-side inclined surface 11 may be provided so as to be inclined gradually along the entire length of the inner protrusion 10 in the axial direction, as shown in FIG. 6.

Figure 7:
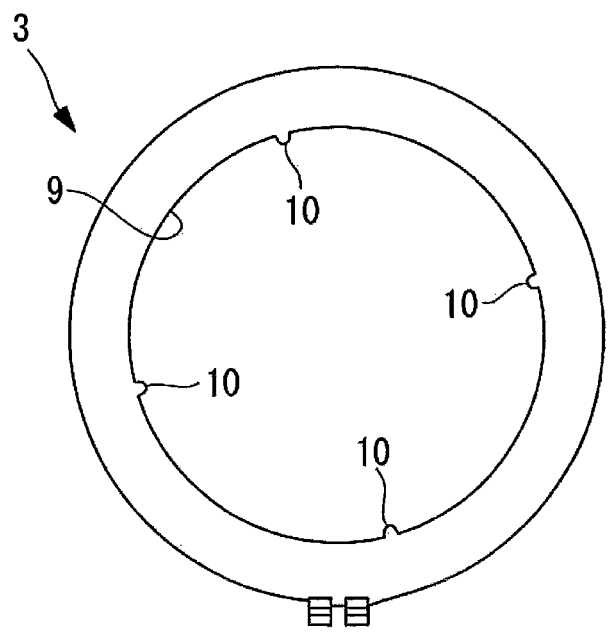
FIG. 7 is a plan view illustrating a second modification of the coil bobbin in FIG. 3.
Figure 8:
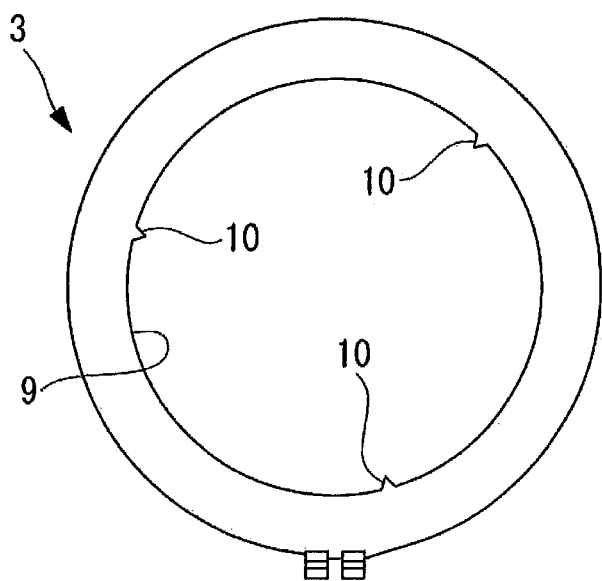
FIG. 8 is a plan view illustrating a third modification of the coil bobbin in FIG. 3.
Figure 9:
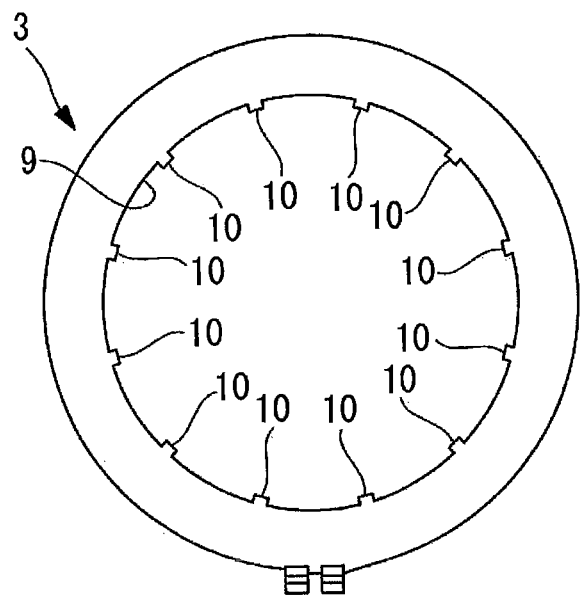
FIG. 9 is a plan view illustrating a fourth modification of the coil bobbin in FIG. 3.
Figure 10:
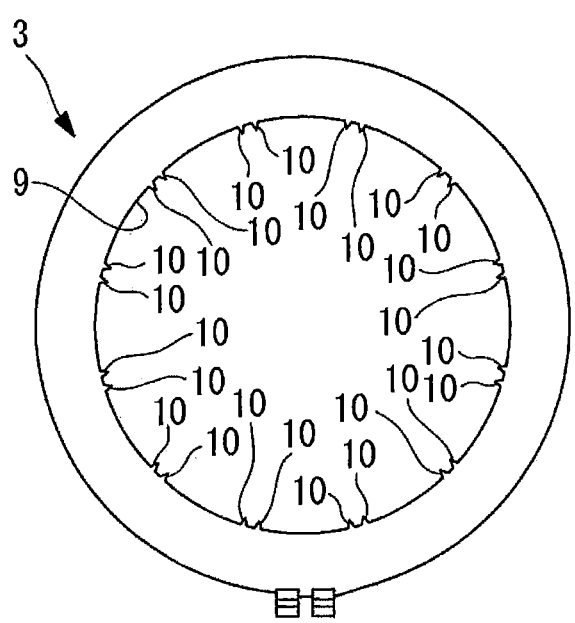
FIG. 10 is a plan view illustrating a fifth modification of the coil bobbin in FIG. 3.

As an alternative to the inner protrusions 10 being provided at 12 locations at equal intervals in the circumferential direction, the inner protrusions 10 may be provided at two or more locations. Preferably, the inner protrusions 10 may be disposed at an arbitrary number of locations, namely, three or more locations, at equal intervals, as shown in FIGS. 7 to 9, or may be disposed regularly, although not at equal intervals, as shown in FIG. 10.

Figure 11:
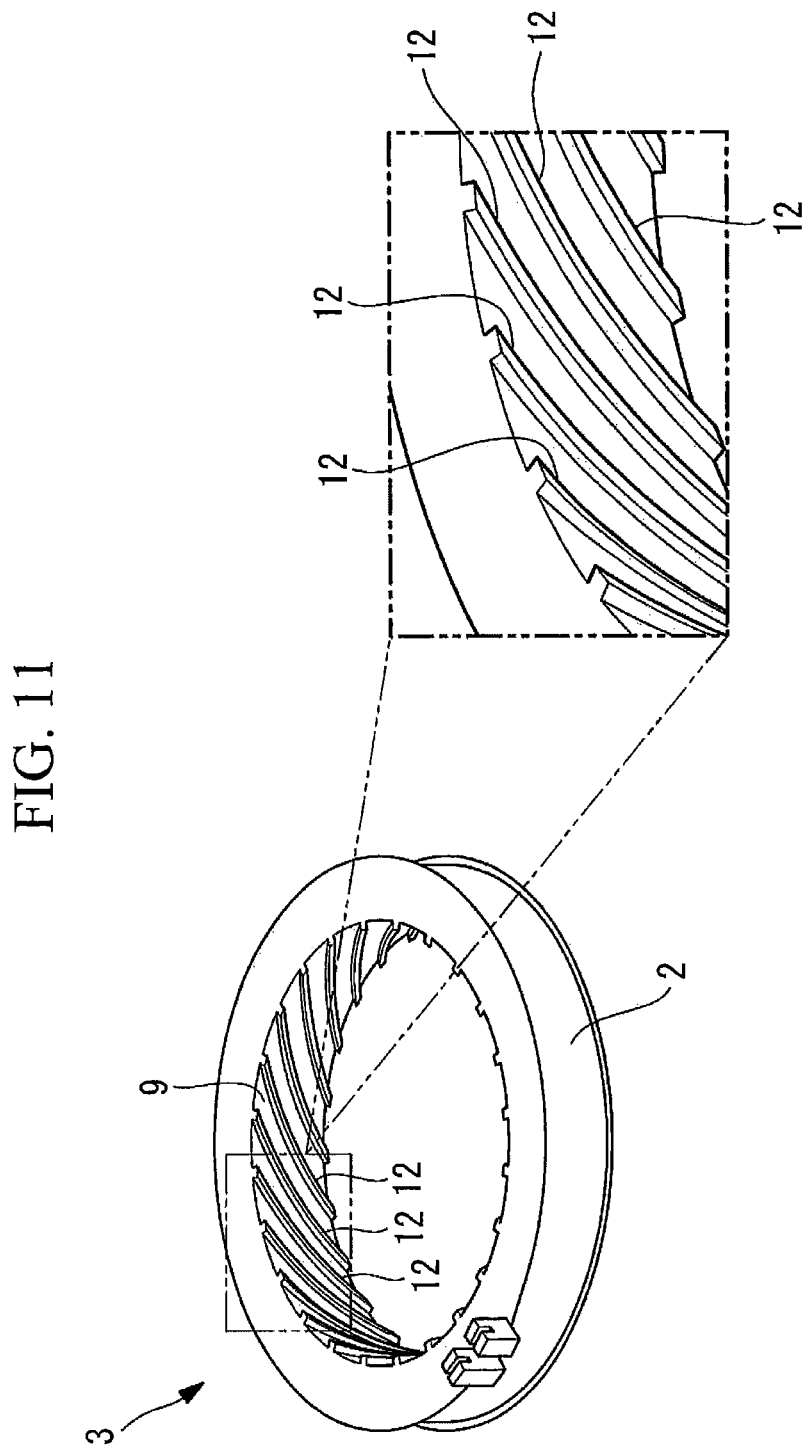
FIG. 11 is a perspective view illustrating a sixth modification of the coil bobbin in FIG. 3.
Figure 12:
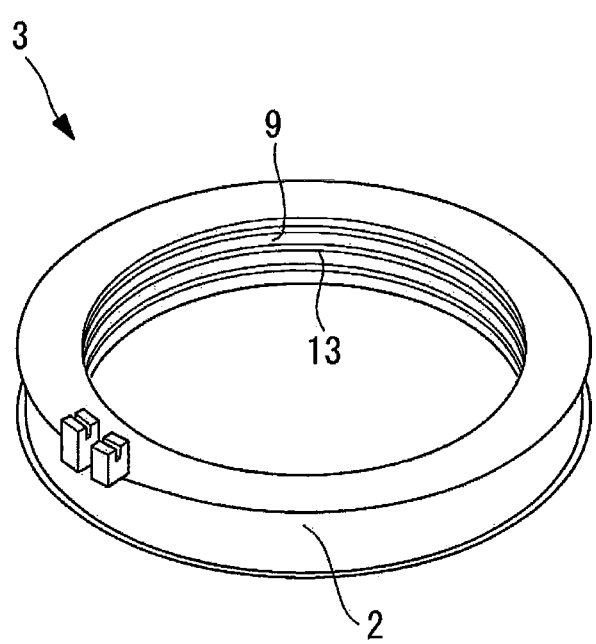
FIG. 12 is a perspective view illustrating a seventh modification of the coil bobbin in FIG. 3.

As an alternative to the inner protrusions 10 that extend straight along the longitudinal axis of the coil bobbin 3, inner protrusions 12 that are inclined in the circumferential direction may be employed, as shown in FIG. 11. As another alternative, an inner protrusion 13 extending helically like a screw may be employed, as shown in FIG. 12.

Figure 13:
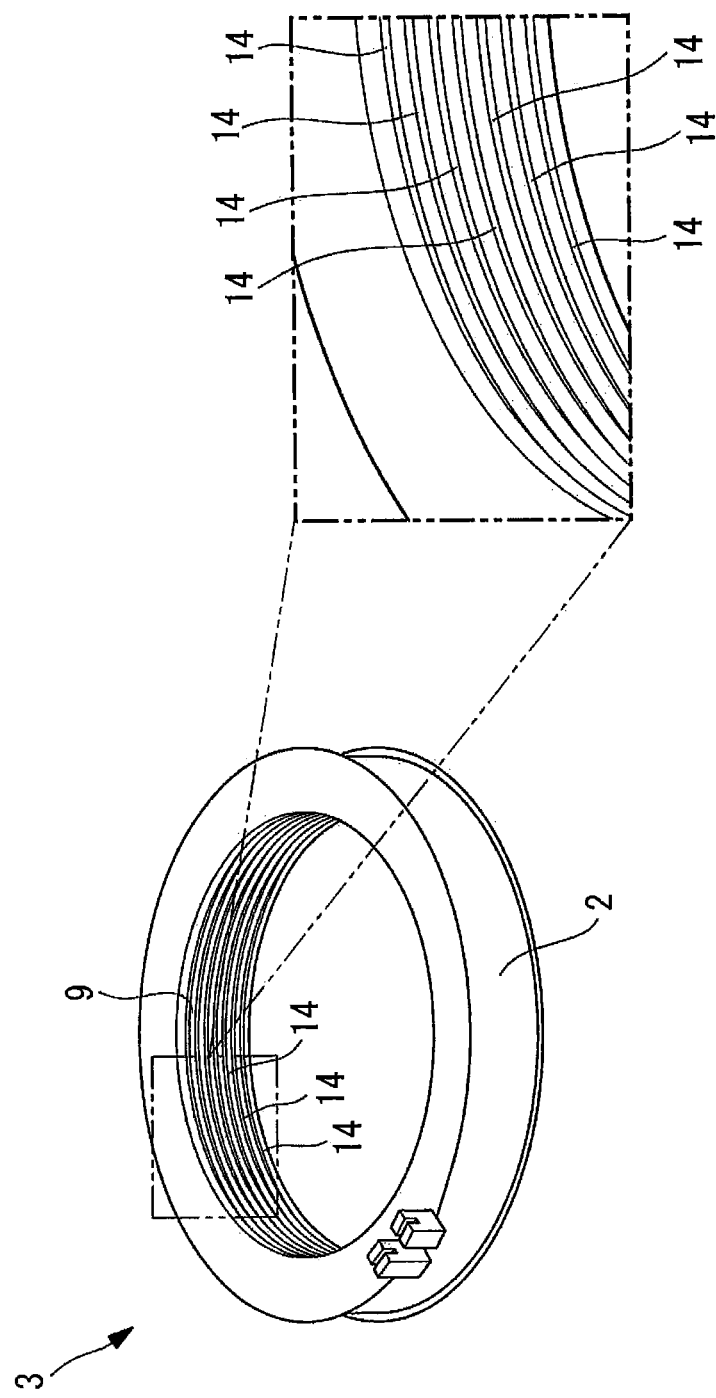
FIG. 13 is a perspective view illustrating an eighth modification of the coil bobbin in FIG. 3.
Figure 14:
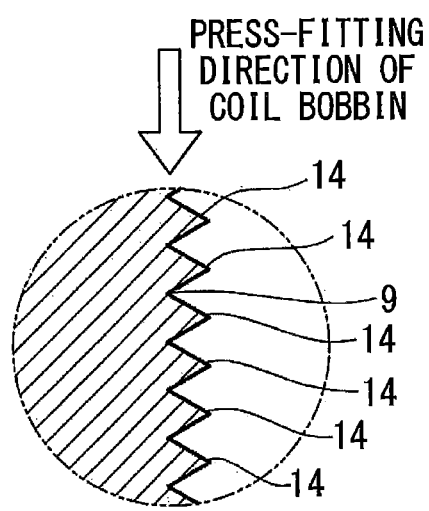
FIG. 14 is a partially-enlarged vertical sectional view of the coil bobbin in FIG. 13.

As shown in FIGS. 13 and 14, a plurality of annular inner protrusions 14 extending in the circumferential direction may be disposed at intervals in the axial direction and may be provided substantially along the entire length in the axial direction.

Figure 15:
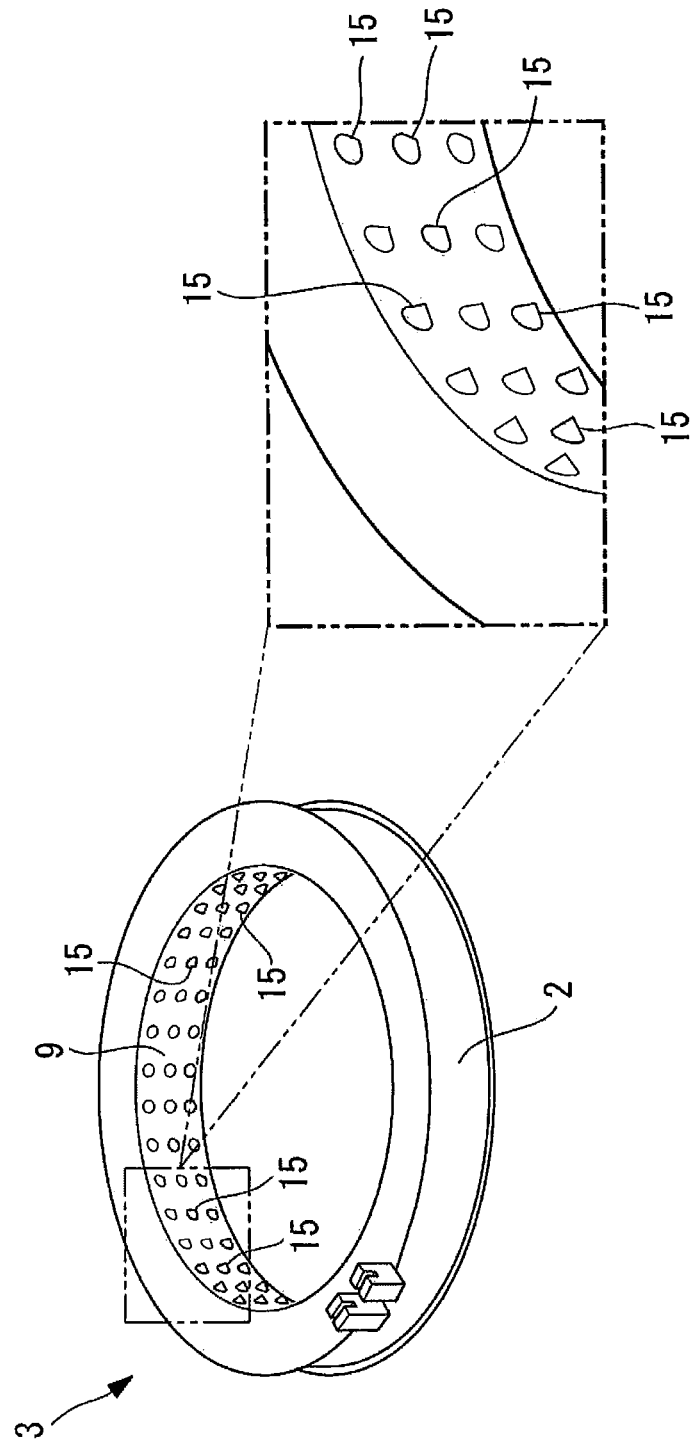
FIG. 15 is a perspective view illustrating a ninth modification of the coil bobbin in FIG. 3.

As shown in FIG. 15, a plurality of conical inner protrusions 15 may be disposed at intervals in the circumferential direction and the axial direction.

According to these configurations, the inner protrusions 14 and 15 can be pressed onto the outer peripheral surface of the central projection 7 uniformly along the entire circumference and substantially along the entire length in the axial direction, so that a sufficiently high securing force can be quickly obtained.

Figure 16:
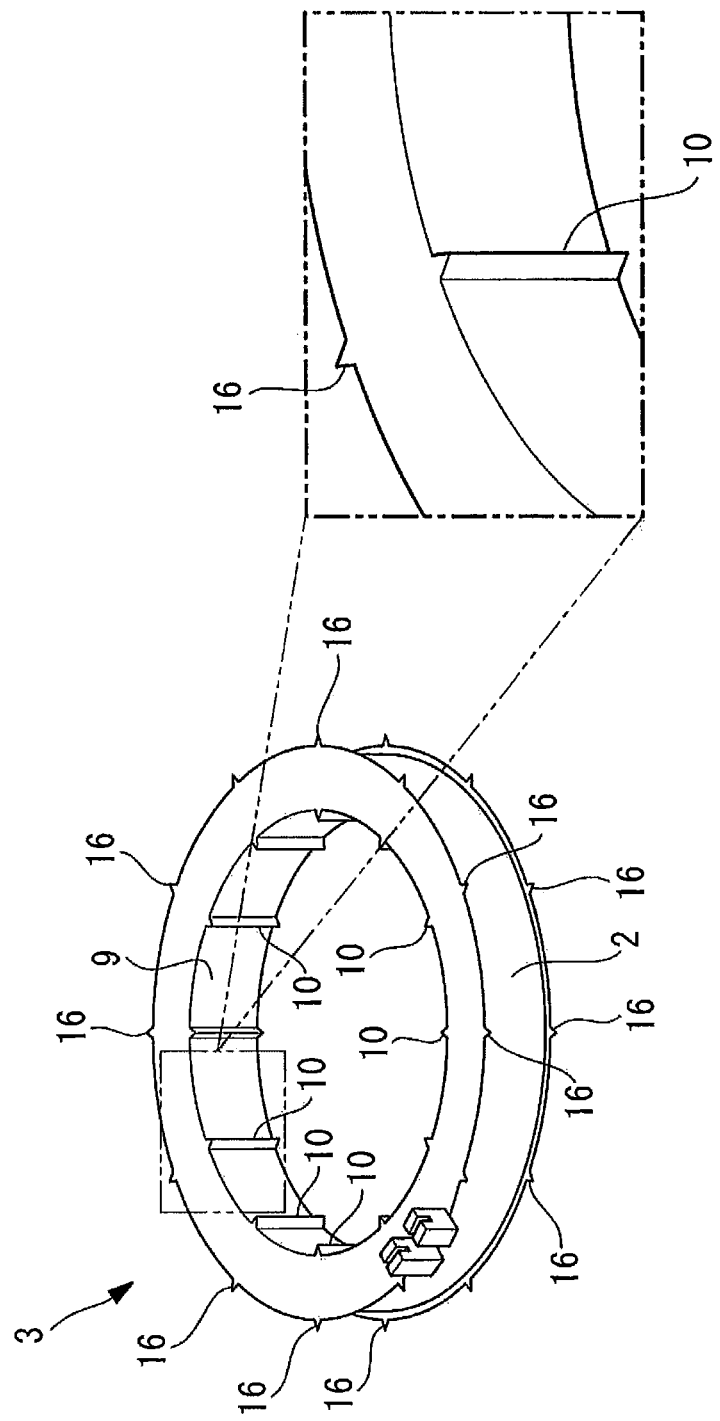
FIG. 16 is a perspective view illustrating a tenth modification of the coil bobbin in FIG. 3.

In this embodiment, in addition to the inner protrusions 10 provided on the inner surface of the center hole 9 in the coil bobbin 3, a plurality of outer protrusions 16 may be provided on the outer peripheral surface of the coil bobbin 3 at intervals in the circumferential direction, as shown in FIG. 16. Accordingly, the outer protrusions 16 are pressed onto the inner peripheral surface of the recess 4 of the brake core 5 uniformly along the entire circumference, thereby further increasing the securing force between the coil bobbin 3 and the brake core 5.

As a result, the following aspect is read from the above described embodiment of the present invention.

An aspect of the present invention provides an electromagnetic brake including an annular coil bobbin around which an excitation coil is wound, a brake core having an annular recess that accommodates the coil bobbin, and an armature driven by an electromagnetic force generated by the excitation coil. An inner surface of a center hole in the coil bobbin is provided with inner protrusions that protrude radially inward from a plurality of locations at intervals in a circumferential direction and that are pressed onto an outer peripheral surface of a columnar central projection included in the recess when the coil bobbin is press-fitted to the recess of the brake core. The inner protrusions are disposed substantially along the entire length of the coil bobbin in an axial direction thereof.

According to this aspect, when the annular coil bobbin having the excitation coil wound therearound is press-fitted in the axial direction to the annular recess provided in the brake core, the center hole in the coil bobbin is fitted to the central projection of the brake core, and the inner protrusions provided on the inner surface of the center hole are pressed onto the outer peripheral surface of the central projection, whereby the coil bobbin and the brake core are secured to each other. Because the inner protrusions disposed substantially along the entire length of the coil bobbin in the axial direction thereof are pressed onto the outer peripheral surface of the central projection included in the recess of the brake core, a sufficient securing force is generated substantially along the entire length in the axial direction, whereby the coil bobbin is secured to the brake core more reliably so as not to move in the circumferential direction within the recess thereof. Consequently, unlike the securing method in the related art that involves the use of an impregnating agent, the securing force can be quickly obtained simultaneously with the press-fitting process, and the coil bobbin can be secured to the brake core at a fixed position.

In the above aspect, the brake core and the coil bobbin accommodated in the recess of the brake core may be secured to each other by means of an adhesive.

Accordingly, the coil bobbin and the brake core are secured to each other by means of the adhesive, whereby the coil bobbin can be secured to the brake core more tightly so as not to move in the rotational direction within the brake core.

In the above aspect, the outer peripheral surface of the central projection may be provided with a conical projection-side inclined surface whose outer diameter gradually increases in the axial direction from a distal end of the central projection.

Accordingly, when fitting the outer peripheral surface of the central projection included in the recess of the brake core to the center hole in the coil bobbin, the projection-side inclined surface provided at the distal end of the central projection facilitates the insertion of the inner protrusions into the recess, and the pressing force from the inner protrusions to the inner side surface of the recess can be increased as the press-fitting process progresses. Consequently, improved ease of insertion of the coil bobbin into the recess of the brake core can be achieved, and a sufficient securing force can be ensured after the press-fitting process.

In the above aspect, each inner protrusion may have a protrusion-side inclined surface that is provided at a leading end of the inner protrusion in a press-fitting direction toward the recess and that gradually extends radially inward toward a trailing end of the inner protrusion.

Accordingly, when press-fitting the coil bobbin into the recess of the brake core, the pressing force from the inner protrusions to the inner side surface of the recess can be increased as the process for press-fitting the inner protrusions into the recess progresses. Consequently, improved ease of insertion of the coil bobbin into the recess of the brake core can be achieved, and a sufficient securing force can be ensured after the press-fitting process.

In the above aspect, an outer peripheral surface of the coil bobbin may be provided with outer protrusions that protrude radially outward from a plurality of locations at intervals in the circumferential direction and that are pressed onto an inner side surface of the recess when the coil bobbin is press-fitted to the recess of the brake core.

Accordingly, in addition to the securing force between the inner protrusions and the inner side surface of the recess, a securing force can also be obtained between the outer protrusions and the inner side surface of the recess, so that the coil bobbin and the brake core can be reliably secured to each other without rotating relatively to each other.

In the above aspect, the inner protrusions may be disposed uniformly in the circumferential direction.

Accordingly, the securing force between the coil bobbin and the brake core can be made uniform along the entire circumference in the circumferential direction.

In the above aspect, the inner protrusions may be inclined relative to the axial direction of the coil bobbin.

In the above aspect, the inner protrusions may have a conical shape and may be disposed at intervals in the axial direction of the coil bobbin.

Another aspect of the present invention provides an electromagnetic brake including an annular coil bobbin around which an excitation coil is wound, a brake core having an annular recess that accommodates the coil bobbin, and an armature driven by an electromagnetic force generated by the excitation coil. An inner surface of a center hole in the coil bobbin is provided with inner protrusions that protrude annularly and radially inward along the entire circumference and that are pressed onto an inner side surface of the recess when the coil bobbin is press-fitted to the recess of the brake core. The inner protrusions are disposed substantially along the entire length of the coil bobbin at intervals in an axial direction thereof.

According to this aspect, since the annular inner protrusions disposed at intervals in the axial direction of the coil bobbin are pressed onto the inner side surface of the brake core along the entire circumference thereof, a sufficient securing force is generated substantially along the entire length in the axial direction, whereby the coil bobbin is secured to the brake core more reliably so as not to move in the rotational direction within the brake core.

REFERENCE SIGNS LIST 1 electromagnetic brake
2 excitation coil
3 coil bobbin
4 recess
5 brake core
6 armature
7 central projection
8 projection-side inclined surface
9 center hole
10, 12, 13, 14, 15 inner protrusion
11 protrusion-side inclined surface
16 outer protrusion

The invention claimed is:
1. An electromagnetic brake comprising:
an annular coil bobbin around which an excitation coil is wound;
a brake core having an annular recess that accommodates the coil bobbin;
an armature driven by an electromagnetic force generated by the excitation coil;
wherein an inner surface of a center hole in the coil bobbin is provided with inner protrusions that protrude radially inward from a plurality of locations at intervals in a circumferential direction and that are pressed onto an outer peripheral surface of a columnar central projection included in the recess when the coil bobbin is press-fitted to the recess of the brake core, the inner protrusions being disposed substantially along the entire length of the coil bobbin in an axial direction thereof; and
wherein each inner protrusion has a protrusion-side inclined surface that is provided at a leading end of the inner protrusion in a press-fitting direction toward the recess and that gradually extends radially inward toward a trailing end of the inner protrusion.

2. The electromagnetic brake according to claim 1, wherein the brake core and the coil bobbin accommodated in the recess of the brake core are secured to each other via an adhesive.

3. The electromagnetic brake according to claim 1, wherein the outer peripheral surface of the central projection is provided with a conical projection-side inclined surface whose outer diameter gradually increases in the axial direction from a distal end of the central projection.

4. The electromagnetic brake according to claim 1, wherein an outer peripheral surface of the coil bobbin is provided with outer protrusions that protrude radially outward from a plurality of locations at intervals in the circumferential direction and that are pressed onto an inner side surface of the recess when the coil bobbin is press-fitted to the recess of the brake core.

5. The electromagnetic brake according to claim 1, wherein the inner protrusions are disposed uniformly in the circumferential direction.

6. The electromagnetic brake according to claim 1, wherein the inner protrusions are inclined relative to the axial direction of the coil bobbin.

7. The electromagnetic brake according to claim 1, wherein the inner protrusions have a conical shape and are disposed at intervals in the axial direction of the coil bobbin.

8. An electromagnetic brake comprising:
an annular coil bobbin around which an excitation coil is wound;
a brake core having an annular recess that accommodates the coil bobbin;
an armature driven by an electromagnetic force generated by the excitation coil; and
wherein an inner surface of a center hole in the coil bobbin is provided with inner protrusions that protrude annularly and radially inward along the entire circumference and that are pressed onto an inner side surface of the recess when the coil bobbin is press-fitted to the recess of the brake core, the inner protrusions being disposed substantially along the entire length of the coil bobbin at intervals in an axial direction thereof; and
wherein each inner protrusion has a protrusion-side inclined surface that is provided at a leading end of the inner protrusion in a press-fitting direction toward the recess and that gradually extends radially inward toward a trailing end of the inner protrusion.

* * * * *